United States Patent
Naftali et al.

(10) Patent No.: US 9,523,909 B2
(45) Date of Patent: Dec. 20, 2016

(54) APPARATUS AND METHODS FOR LOCKING RESONATING FREQUENCY OF A MINIATURE SYSTEM

(75) Inventors: Matan Naftali, Moshav Aloney-Aba (IL); Eytan Keydar, Rehovot (IL); Tal Langer, Hod Hasharon (IL); Sharon Hornstein, Pardes Hanna (IL)

(73) Assignee: MARADIN TECHNOLOGIES LTD., Yoqne'am (IL)

( * ) Notice: Subject to any disclaimer, the term of this patent is extended or adjusted under 35 U.S.C. 154(b) by 273 days.

(21) Appl. No.: 14/342,676

(22) PCT Filed: Sep. 4, 2012

(86) PCT No.: PCT/IL2012/050351
§ 371 (c)(1),
(2), (4) Date: Mar. 4, 2014

(87) PCT Pub. No.: WO2013/030842
PCT Pub. Date: Mar. 7, 2013

(65) Prior Publication Data
US 2014/0218700 A1    Aug. 7, 2014

Related U.S. Application Data

(60) Provisional application No. 61/530,977, filed on Sep. 4, 2011.

(51) Int. Cl.
*G02B 26/00* (2006.01)
*G02F 1/01* (2006.01)
(Continued)

(52) U.S. Cl.
CPC ........... *G03B 21/28* (2013.01); *G02B 26/0841* (2013.01); *G09G 3/025* (2013.01); *G09G 3/346* (2013.01); *G09G 2310/08* (2013.01)

(58) Field of Classification Search
CPC ...... G03B 21/28; G09G 3/025; G02B 26/0841
(Continued)

(56) References Cited

U.S. PATENT DOCUMENTS

| | | |
|---|---|---|
| 4,801,897 A | 1/1989 | Flecken |
| 6,094,102 A | 7/2000 | Chang et al. |

(Continued)

FOREIGN PATENT DOCUMENTS

| | | |
|---|---|---|
| WO | 2006/116271 | 11/2006 |
| WO | 2012/003433 | 1/2012 |
| WO | 2012/017572 | 9/2012 |

OTHER PUBLICATIONS

Kilcher, et al., MEMS-based micro projection system with a 1.5cc optical engine SPIE MOEMS-MEMS, Feb. 2012, pp. 1-6.
(Continued)

*Primary Examiner* — William Choi
(74) *Attorney, Agent, or Firm* — Browdy and Neimark, P.L.L.C.

(57) ABSTRACT

A resonance locking system for a pico-projector, the system comprising a resonance frequency sensor operative for sensing change in resonance frequency of a miniature mechanical device (10) including a moving mirror assembly having a driving frequency, by comparing a current resonance frequency to a reference; and a feedback loop changing at least one aspect of use of the miniature moving mirror assembly responsive to a current value of the resonance frequency measured by the sensor.

22 Claims, 11 Drawing Sheets

(51) Int. Cl.
    *G03B 21/28*     (2006.01)
    *G09G 3/02*     (2006.01)
    *G02B 26/08*     (2006.01)
    *G09G 3/34*     (2006.01)

(58) Field of Classification Search
    USPC .... 359/199.1, 213.1, 214.1, 221.2, 239, 292
    See application file for complete search history.

(56) References Cited

U.S. PATENT DOCUMENTS

| | | |
|---|---|---|
| 7,485,485 B2 | 2/2009 | Linden et al. |
| 7,907,019 B1 | 3/2011 | Brown |
| 8,525,605 B2 | 9/2013 | Yamakawa et al. |
| 2005/0104675 A1 | 5/2005 | Brunson et al. |
| 2005/0253055 A1 | 11/2005 | Sprague et al. |
| 2005/0280879 A1 | 12/2005 | Gibson et al. |
| 2006/0139719 A1 | 6/2006 | Nishio |
| 2007/0188253 A1 | 8/2007 | Sutardja |
| 2008/0158631 A1 | 7/2008 | Davis et al. |
| 2011/0001888 A1 | 1/2011 | Brown et al. |
| 2011/0048130 A1 | 3/2011 | Krylov et al. |
| 2011/0109951 A1 | 5/2011 | Goren et al. |
| 2011/0181931 A1 | 7/2011 | Luft et al. |
| 2011/0254599 A1 | 10/2011 | Dikshit et al. |
| 2012/0307211 A1 | 12/2012 | Hofmann et al. |

OTHER PUBLICATIONS

Lenzhofer, et al., MOEMS translatory actuator characterisation, position encoding and closed-loop control, Mycrosyst Technol, 2010, pp. 901-907, vol. 16.

Fig. 12

1210: Two excitation voltage pulses, D1 and D2, drive the XMEMS 10, such that the x axis (e.g. 210 in Fig. 2) rotates and capacitance is created between its variable capacitor plates

↓

1220. The capacitance signals CX1 and CX2 are continuously sent to the XSense 105 such that at every point in time, the difference VXO=CX1-CX2 is computed

↓

1230. The VXO signal is positive during one half of the motion period and negative during the second half of the motion period of the XMEMS 10. Therefore, in some point in time, this signal crosses a reference level value, which is the zero capacitance value

↓

1240. The VXO signal is sent to the PLL 110

↓

1250. The PLL 110 generates an internal signal (DIV_OUT), which toggles when the VXO capacitance signal crosses the zero-reference-level. The DIV_OUT signal is a logic signal with two states (either 0 or 1) where the change between the two states occurs when the input signal VXO crosses the reference level

↓

1260. When DIV_OUT toggles down (from 1 to zero), the PLL 110 sends a voltage signal D1 Ctrl. When DIV_OUT toggles up (from zero to 1), the PLL 110 sends a voltage signal D2 Ctrl. The polarity of these signals can be changed (e.g. which signal is sent from the PLL 110 when it toggles up or down may be determined by choice)

↓

1270. The signals D1 Ctrl and D2 Ctrl are boosted at the High Voltage Pulse Generator. The time delay between D1 Ctrl and D1 and between D2 Ctrl and D2 is a constant delay, due to the amplification of the of the 3.3 volt signals to the 80 volt signals.

Fig. 13a

1320: Two excitation voltage pulses, D1 and D2, drive the XMEMS 10, such that the x axis rotates and capacitance is created between its variable capacitor plates

↓

1330: The capacitance signals CX1 and CX2 are continuously sent to the XSense 305 such that at every point in time, the difference VCX=CX1-CX2 is computed

↓

1340: The VCX signal is positive during one half of the motion period and negative during the second half of the motion period of the XMEMS 10. Therefore, in some point in time, this signal crosses a reference value, which is the zero capacitance value

↓

1350: The VCX signal is sent to the Sample & Compare unit 310

↓

1360: The Sample & Compare unit 310 samples the continuous VCX signal at two predefined sample times SMP1 and SMP2. At these points in time, the value of the capacitance is compared. S1 and S2 are the capacitance values at sample times SMP1 and SMP2, respectively

↓ to Fig. 13b, step 1365

Fig. 13b from Fig. 13a, step 1360

↓

1365: If S1=S2 (Fig. 11a), the VCX was sampled exactly at the zero-crossing point, which implies that S1=S2=0. In this case, the frequency of D1 and D2 is perfectly tuned to the frequency of the VCX, so no change is required in the driving pulses frequency

↓

1370: If S1>S2 (Fig. 11b), the VCX is shifted to the left-hand side. This implies that the frequency of D1 Ctrl and D2 Ctrl should be increased. The Sample and Compare unit 310 sends a control signal to the Digital Logic circuit 320, which increases the frequency of the driving pulses. This continues until the condition of S1 equals S2 is satisfied, which ensures that the device operates at resonance frequency. Alternatively, if S1<S2, the VCX is shifted to the right-hand side. This implies that the frequency of D1 Ctrl and D2 Ctrl should be decreased. The Sample and Compare unit 310 sends a control signal to the Digital Logic circuit 320, which decreases the frequency of driving pulses

↓

1375. The resolution of the change in the frequency can be tuned, in the range of 0.1Hz to 1 Hz. This means that the change of the D1 Ctrl and D2 Ctrl is iterative, and the amount of change that is supplied to these signals is relative to the desired change, but is not necessarily equal to the desired change

↓

1380. The D1 Ctrl and D2 Ctrl signals are boosted at the High Voltage Pulse Generator. The time delay between D1 Ctrl and D1 and between D2 Ctrl and D2 is a constant delay, due to the amplification of the 3.3 volt signals to the 80 volt signals

APPARATUS AND METHODS FOR LOCKING RESONATING FREQUENCY OF A MINIATURE SYSTEM

REFERENCE TO CO-PENDING APPLICATIONS

Priority is claimed from U.S. Provisional Patent Application No. 61/530,977, entitled "A mechanism for resonating frequency lock" and filed Sep. 4, 2011.

FIELD OF THIS DISCLOSURE

The present invention relates generally to Micro-Electro-Mechanical Systems.

BACKGROUND FOR THIS DISCLOSURE

Conventional technology constituting background to certain embodiments of the present invention is described in the following publications, inter alia:

> US 2011/0001888 A1 to Brown et al (assigned to Microvision)
> US 2008/0158631 A1 to Davis et al (assigned to Microvision)
> US 2005/0280879 A1 to Gibson (assigned to Microvision)
> MOEMS translatory actuator characterization, position encoding
> and closed-loop control
> M. Lenzhofer • A. Tortschanoff • A. Frank •
> T. Sandner • H. Schenk • M. Kraft • A. Kenda
> Microsyst Technol (2010) 16:901-907
> DOI 10.1007/s00542-010-1029-5
> US 2011/0181931 A1 to Luft et al (assigned to BTendo)
> US 2011/0109951 A1 to Goren et al (assigned to BTendo)

Lucio Kilcher, Nicolas Abelé* LEMOPTIX SA, Parc Scientifique EPFL, PSE-D, 1015 Lausanne, Switzerland, *MEMS-based micro projection system with a 1.5 cc optical engine*, in MOEMS and Miniaturized Systems XI, edited by Harald Schenk, Wibool Piyawattanametha, Wilfried Noell, Proc. of SPIE Vol. 8252, 825204•© 2012 SPIE•CCC code: 0277-786x/12/$18•doi: 10.1117/12.912852, Proc. of SPIE Vol. 8252 825204-1.

The disclosures of all publications and patent documents mentioned in the specification and of the publications and patent documents cited therein directly or indirectly are hereby incorporated by reference. Materiality of such publications and patent documents to patentability is not conceded.

SUMMARY OF CERTAIN EMBODIMENTS

Certain embodiments of the present invention seek to provide frequency control schemes and resonance locking mechanism and architecture for such mechanical devices such as MEMS.

Certain embodiments of the present invention seek to provide a system or mechanism for providing resonating frequency lock a resonance locking method which determines a change from the resonance operating frequency of a mechanical system.

Certain embodiments of the present invention seek to provide a method which shifts the driving frequency to the resonance frequency of the MEMS.

Certain embodiments of the present invention seek to provide a method which shifts the operating frequency to the resonance frequency using a PLL unit, where the reference clock is when the sensor crosses zero-level.

Certain embodiments of the present invention seek to provide a method which shifts the operating frequency to the resonance frequency using a comparison of two measurements of the sensor signals at a particular timing of the driving pulses a method which shifts the operating frequency in the amount correlated to the difference of the measurements.

Certain embodiments of the present invention seek to provide a method for driving a MEMS, e.g. one which projects light, in a closed loop by providing a driving frequency whose phase maintains a fixed relationship with a reference, namely the resonance frequency phase of a signal representing the resonance frequency of a MEMS. For example, if the phase is 0, the two frequencies are the same.

Many MEMS-based mechanical devices require tilting motion of reflecting surfaces (e.g. micro-mirrors). In particular, there are devices for applications that depend on a predetermined frequency (such as resonance frequency) of the tilting motion, which is crucial for the functionality of the device. One of such applications uses scanning micro-mirror devices for the use of display, in which the scanning frequency determines the display resolution and the quality of the display.

Excitation of such mechanical devices at a particular frequency facilitates the proper operation and functionality of the devices. Determination of a specific frequency could be applied in various methods, which include the use of external components for sensing the movement frequency and controlling it (e.g., acoustic sensing and control circuits), or the use of implemented sensors, which are embedded within the design of the device, with additional external controller or electrical sensor. In most cases, the second method is preferred due to its simplicity and reduction of costs.

A common method for sensing the movement frequency of a MEMS-based device via embedded sensors is by using a capacitive sensor. Such sensors are easy to implement in MEMS manufacturing technologies and their use enables high sensitivity. In such sensors, the physical movement of the device is expressed by a change of the capacitance, thus the correlation between the actual movement frequency of the device and the desired one could be obtained. Nevertheless, in order to find the resonance frequency of a device, the maximum amplitude of the movement may be monitored as well, and in most cases additional sensors are employed for this. In current state-of-the-art MEMS-based devices, the use of external sensors is prevalent, and the complementary control schemes usually utilize a phase-shift computation between actuation and the device's motion signals. The phase shift is determined by the difference in time between the fundamental harmonic of the actuation signal and that of the device's deflection. When the device vibrates at its resonance, there is a phase shift of 90 degrees between the actuation signal and the device's deflection (see FIG. 8). In other words, the centers of the actuation pulses (irrespective of their waveform e.g. pulse or sine waveforms) are aligned with the points where capacitance of the device crosses some reference level (e.g. zero level) to determine the phase shift.

The invention described henceforth may include a system and method for sensing and controlling the resonating frequency of MEMS-based mechanical devices. The invention described henceforth may include a precise control process for robust locking of a device resonating frequency, enabling high quality performances typically desirable in such devices.

There is thus provided, in accordance with some preferred embodiments of the present invention, a method of sensing and resonating frequency locking for mechanical devices, which may include:
  a. A sensor that converts the movement of the mechanical device into an electrical signal
  b. A standard Phase Locked Loop (PLL)
  c. A pulse generator to generate the driving pulses of the mechanical device
  d. Sampling and Comparison unit
  e. Digital logic blocks.

Certain embodiments of the invention presented here include a new architecture that is based on a novel technology to present a new system and method for frequency control and resonance locking of mechanical devices. This novel architecture provides improved performance over known state-of-the-art technologies and/or reduces dimension and/or cost of devices.

When a mechanical system is driven at its resonance frequency, its motion amplitude is maximal and the driving pulses are located at a constant phase-difference with respect to the motion signal. If the driving frequency (excitation frequency) is close (but not equal) to the resonance frequency of the mechanical system, the rotation angle is smaller than the maximum value and a shift occurs in the location of the driving pulses with respect to the graphed movement of the system (see FIG. 7b). This shift is used in order to sense the shift of, control and converge the frequency until locks on the resonance frequency of the device.

Certain embodiments of the present invention include two methods for utilization of the above phenomenon. The first (see FIGS. 9b-10) includes a High Voltage Pulse Generator (HVPG), a mechanical device (XMEMS), sensor (XSense) and a PLL. HVPG takes control signals from PLL, and then generates pulses that are applied to XMEMS. The pulses excite the device to move back and forth. As the device rotates, its equivalent capacitance varies accordingly. This capacitance variation is detected by the sensor that generates a logic output (VXO), which toggles when the device capacitance crosses the reference level. VXO is used as a reference clock for the PLL that adjusts its divider output phase and frequency to match with that of VXO.

To have the system lock at the device's resonance, a phase shift of 90 degrees between the device movement and the pulse actuation may be employed. In order to achieve this condition, the PLL will have to provide control signals to HVPG in the manner that those signals are ahead of VXO in time by an amount of internal delays in the system plus half of the driving pulse time.

An additional method to control and lock on resonance frequency is described in FIGS. 9c and 11a. This locking concept is based on the observation that the values of the device at the centers of the driving pulses are the same, when the device operates at resonance frequency.

The locking system based on the above principle of operation includes a High Voltage Pulse Generator (HVPG), a mechanical device (XMEMS), sensor (XSense), Sample & Compare block, and Digital Logic (DL) circuit. HVPG takes control signals from Digital Logic instead of PLL, and HVPG and XMEMS work in the same way as they do in the first locking system described above. XMEMS sensor variation is recovered by XSense that generates an analog output—VCX.

The Sample and Compare circuit acquires two samples of VCX at centers of D1 and D2 (driving pulses). The results of this sampling process are VS1 and VS2, which are equivalent to sensor signals at the centers of the driving pulses. VS1 and VS2 are compared against each other. If the device operates at resonance frequency, these two signals will be the same and Digital Logic will keep the actuation frequency constant.

In the other case, if the device works at a frequency that is lower than the resonance one, the phase shift between the device's movement and actuation is less than 90 degrees. Therefore, the VCX curve in the timing figure moves to the left, and thus the value sampled is changed. As the result, VS1 is greater than VS2, and the comparison circuit detects this and sends out a control signal to the Digital Logic circuit, which causes an increase of the frequency of actuation pulses. The increasing process continues until the condition of VS1 equals VS2 is satisfied and thus ensures the device operates at resonance frequency.

The same process in the reverse direction may operate in the same manner, such that the device reaches its resonance frequency if the actuation frequency was tuned initially at a higher frequency.

FIG. 8 is an illustration of a frequency response of a MEMS-based mechanical device including a scanning mirror. FIG. 7b is a numerical simulation of a scanning mirror movement (sine waveform), along with its driving pulses (rectangle pulses) and sensing signals with a 20 Hz shift from resonance frequency. Notice time shift of sensor signal to driving pulse. The driving pulse is scaled by a factor of 15 and the sensing signals by a factor of 10^12, so that the three waveforms can be displayed clearly in the same figure.

FIGS. 9b and 10 illustrate respectively a block diagram and operation waveform of a phase lock embodiment. FIGS. 9c and 11a illustrate respectively a block diagram and operation waveform of a Sample & Compare embodiment.

The frequency detection and resonance locking system may include:
  1. A rotating mechanical device, said a scanning micromirror, which rotates in a repeatable method of a particular frequency.
  2. The device of 1 that has a resonating frequency.
  3. The device of 1 that has a sensor that determines the movement of the device and converts it into an electrical signal.
  4. The device of 1 that has a sensor that determines the movement of the device and converts it into an electrical signal, with a particular frequency.
  5. The device of 1 that is actuated using repeatable pulses with a particular exciting frequency.
  6. The device of 1 that is actuated using repeatable pulses with a particular exciting frequency, which has a maximal movement when actuated in its resonance frequency of claim 2.
  7. A resonance locking mechanism which determines a change from the resonance operating frequency of the device in 1.
  8. The mechanism described in 7 which shifts the operating frequency to the resonance frequency.
  9. The mechanism described in 7 which shifts the operating frequency to the resonance frequency using a PLL mechanism.
  10. A mechanism described in 7 which shifts the operating frequency to the resonance frequency using a PLL mechanism, where the reference clock is when the sensor crosses zero-level.

11. A mechanism described in 7 which shifts the operating frequency to the resonance frequency using a comparison of two measurements of the sensor signals at a particular timing of the driving pulses.

12. A mechanism described in 11 which shifts the operating frequency in the amount correlated to the difference of the measurements.

In accordance with an aspect of the presently disclosed subject matter, there is provided a resonance locking system for a pico-projector, the system comprising: a resonance frequency sensor operative for sensing change in a varying resonance frequency of a miniature mechanical device including a moving mirror assembly having a driving frequency, by comparing a current resonance frequency to a reference; and a feed-back loop changing at least one aspect of use of the miniature moving mirror assembly responsive to a current value of the resonance frequency measured by the sensor.

In accordance with an embodiment of the presently disclosed subject matter, there is provided the system wherein the moving mirror assembly is driven at a driving frequency and wherein the feedback loop is operative to shift at least the driving frequency responsive to at least a most recently monitored value of the resonance frequency.

In accordance with an embodiment of the presently disclosed subject matter, there is further provided the system wherein the miniature mechanical device comprises a MEMS.

In accordance with an embodiment of the presently disclosed subject matter, there is yet further provided the system wherein the driving frequency is shifted to a multiple of the most recently measured value of the resonance frequency of the mechanical device.

In accordance with an embodiment of the presently disclosed subject matter, there is yet further provided the system which uses a PLL unit to shift the driving frequency to the resonance frequency at a reference clock occurring when the apparatus for sensing crosses a zero-reference-level.

In accordance with an embodiment of the presently disclosed subject matter, there is yet further provided the system wherein the mechanical device includes a stator and a rotor forming respective parallel plates of a variable capacitor and defining first and second capacitance signals.

In accordance with an aspect of the presently disclosed subject matter, there is provided a resonance locking method for a pico-projector, comprising: providing a resonance frequency sensor operative for monitoring a change in a varying resonance frequency of a miniature mechanical device including a moving mirror assembly, by comparing a currently sensed capacitance signal having a frequency to a reference; and if change is monitored by the sensor, changing at least one aspect of use of the mechanical device responsive to the currently sensed resonance frequency.

In accordance with an embodiment of the presently disclosed subject matter, there is provided the system which shifts the operating frequency to the resonance frequency using a comparison of two measurements of the sensor signals at a particular timing of the driving pulses.

In accordance with an embodiment of the presently disclosed subject matter, there is further provided a method wherein the changing at least one aspect of use comprises adjusting a driving frequency for the mechanical device responsive to the resonance frequency currently measured from the sensed capacitance signal.

In accordance with an embodiment of the presently disclosed subject matter, there is yet further provided the system wherein the reference comprises a zero-reference-level of a difference between the first and second capacitance signals, wherein the zero-reference-level occurs during a transition between: a first state in which the first capacitive signal is positive and non-negligible, the second capacitive signal is negligible, and the difference is positive; and a second state in which the first capacitive signal is negligible, the second capacitive signal is positive and non-negligible, and the difference is negative.

In accordance with an embodiment of the presently disclosed subject matter, there is yet further provided the system wherein the resonance frequency defines a period and wherein the comparing comprises identifying a zero crossing level once each half of the period.

In accordance with an embodiment of the presently disclosed subject matter, there is yet further provided the system wherein the reference comprises a zero capacitance level.

In accordance with an embodiment of the presently disclosed subject matter, there is yet further provided the system wherein the resonance frequency defines a period and wherein sampling of a continuous signal representing the difference is performed twice each half of the period.

In accordance with an embodiment of the presently disclosed subject matter, there is yet further provided the system wherein the comparing comprises comparing a first capacitive value within sampled data to an additional capacitive value within the sampled data, the system also comprising a sample and compare component operative to determine timing of sampling of the sampled data.

In accordance with an embodiment of the presently disclosed subject matter, there is yet further provided the system wherein the device comprises a mirror assembly including a micro-mirror mounted and driven to rotate about an axis.

In accordance with an embodiment of the presently disclosed subject matter, there is yet further provided the system wherein the device comprises a mirror assembly including a micro-mirror mounted and driven to vibrate laterally along an axis.

In accordance with an embodiment of the presently disclosed subject matter, there is yet further provided the system wherein the resonance locking system comprises a pico-projector and the mirror assembly is a component of the pico-projector.

In accordance with an embodiment of the presently disclosed subject matter, there is yet further provided the system wherein the device comprises an assembly including a mechanical component mounted and driven to rotate about an axis.

In accordance with an embodiment of the presently disclosed subject matter, there is yet further provided a method wherein the adjusting of the driving frequency for the mechanical device comprises setting the driving frequency to equal the resonance frequency currently measured from the sensed capacitance signal.

In accordance with an embodiment of the presently disclosed subject matter, there is yet further provided the system wherein, if the first value differs from the additional value, the resonance frequency is different from the driving frequency and the feedback loop adjusts the resonance frequency accordingly.

In accordance with an embodiment of the presently disclosed subject matter, there is yet further provided the system wherein the mechanical device includes a stator and a rotor forming a variable capacitor and defining two capacitance signals and a difference therebetween and wherein the current resonance frequency is derived from the difference.

In accordance with an embodiment of the presently disclosed subject matter, there is yet further provided the system wherein the device comprises a physical element mounted and driven for periodic motion, defining a motion period.

In accordance with an embodiment of the presently disclosed subject matter, there is yet further provided the system wherein a difference between the first and second capacitance signals is positive during a half of the motion period and negative during another half of the motion period, such that the difference corresponds to a capacitance signal having a zero mean value, and wherein the resonance frequency sensor is operative for sampling a continuous signal representing the difference.

In accordance with an embodiment of the presently disclosed subject matter, there is yet further provided the system wherein the reference comprises a zero-reference-level of the difference between the first and second capacitance signals, wherein the zero-reference-level occurs during a transition between: a first state in which the first capacitive signal is positive and non-negligible, the second capacitive signal is negligible, and the difference is positive; and a second state in which the first capacitive signal is negligible, the second capacitive signal is positive and non-negligible, and the difference is negative.

In accordance with an embodiment of the presently disclosed subject matter, there is yet further provided the system which includes a sample-and-compare component which computes a difference between a current value of the driving frequency and the resonance frequency and shifts the driving frequency toward the resonance frequency by an amount related to the difference.

It is appreciated that NEMS (nano electro mechanical systems) may also be driven or sensed using the methods described herein for MEMS, mutatis mutandis.

The terms "scanning frequency" (for devices which have a scanning-type operation, such as but not limited to a scanning mirror of a pico-projector), "operating frequency", "driving frequency", and "actuation frequency" are used herein generally interchangeably.

The resonance frequency of some miniature mechanical devices changes e.g. as a result of the device's own operation and/or known and unknown environmental variables which vary either due to operation and/or over time and/or over location, the variables including but not limited to temperature, humidity, pressure, and radiation directed at the system e.g. light impinging on an optical element e.g. mirror if the mechanical device comprises a moving e.g. rotating or vibrating optical element e.g. mirror.

Any aspect of use of the mechanical system may be changed responsive to the current resonance frequency. For example, mechanical devices may be discarded if the resonance frequency is found to fluctuate excessively or inappropriately. Or, operating parameters of the mechanical system, such as but not limited to the driving frequency thereof, may be changed, to a function of at least the currently sensed value, and possibly also previously sensed values, of the resonance frequency, e.g. a multiple n thereof where n may be 1 in which case the driving frequency is shifted by the feedback loop to the most recently monitored resonance frequency.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, terms such as "processing", "computing", "estimating", "selecting", "ranking", "grading", "calculating", "determining", "generating", "reassessing", "classifying", "producing", "stereo-matching", "registering", "detecting", "associating", "superimposing", "obtaining", or the like refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to versions, individual products, and the like. It will be appreciated that this terminology is intended to convey general principles of operation clearly and briefly, by way of example, and is not intended to limit the scope of the invention to any particular system version or individual product.

Elements separately listed herein need not be distinct components and alternatively may be the same structure.

BRIEF DESCRIPTION OF THE DRAWINGS

Certain embodiments of the present invention are illustrated in the following drawings:

FIG. 12 is a simplified flowchart illustration of a first example method for monitoring changes in the resonance frequency of a MEMS (Micro Electro Mechanical System).

FIGS. 13a-13b, taken together, form a simplified flowchart illustration of a second example method for monitoring changes in the resonance frequency of a MEMS (Micro Electro Mechanical System).

DETAILED DESCRIPTION OF CERTAIN EMBODIMENTS

Figure 1:
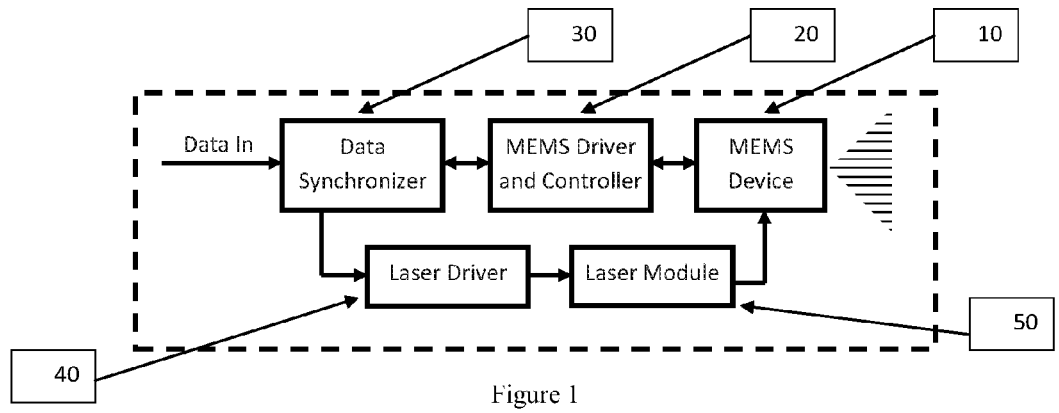
FIG. 1 is a simplified block diagram illustration of a MEMS-based laser projector, e.g. pico-projector, constructed according to an embodiment of the invention.

FIG. 1 is a simplified block diagram illustration of a MEMS-based laser projector, e.g. pico-projector, constructed according to an embodiment of the invention. The system typically comprises a MEMS device 10 such as but not limited to a coated silicon component, a MEMS driver and controller 20, a data synchronizer unit 30, a laser driver 40 and a laser module 50. The MEMS device 10 may for example comprise a moving mirror assembly having a mirror formed of aluminum-coated silicon such as for example a Microvision Inc. pico projector, PicoP©, or Fraunhofer IPMS (Fraunhofer Institute For Photonic Microsystems) micro mirror. The data to be projected typically constitutes the input of the system, and the output typically comprises the emission (visible or invisible light) that is projected from the MEMS due to its rotational motion. It is appreciated however that the apparatus and methods for monitoring for changes in, and optionally for locking, resonating frequency of a miniature system, as shown and described herein, are suitable for a wide variety of miniature systems not limited to the moving mirrors of a projector and not limited to MEMS as opposed to, for example, NEMS.

Figure 2:
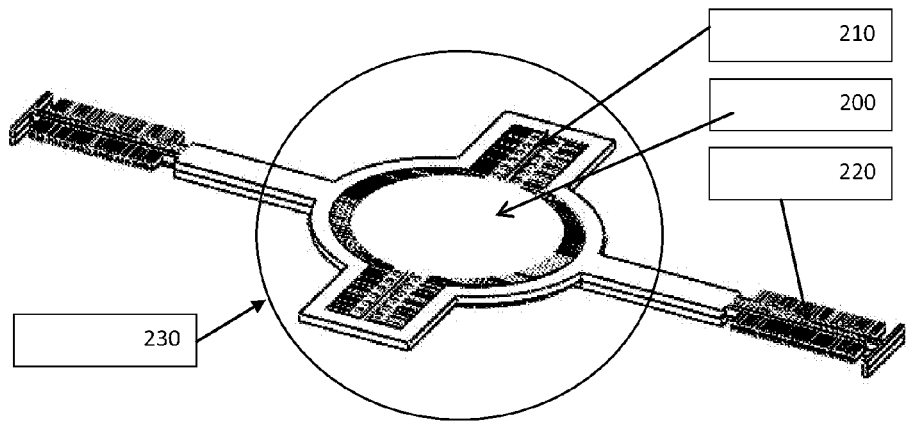
FIG. 2 is a system sketch that depicts a two-axis mirror 200 constituting an example for MEMS device 10 of FIG. 1.

FIG. 2 is a system sketch that depicts a two-axis mirror 200 constituting an example for MEMS device 10 of FIG. 1. The mirror 200, which need not necessarily be circular as in the illustrated embodiment, is typically supported by one or both of two suspensions: a horizontal axis (also termed herein the x axis) 210 serving as an internal suspension and a vertical axis 220 serving as an external suspension.

Figure 3:
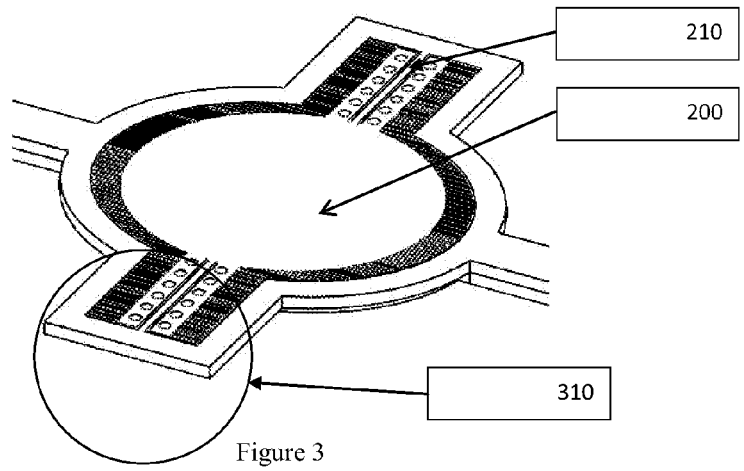
FIG. 3 is a detailed view of a portion of the apparatus of FIG. 2, which focuses on the horizontal axis of the mirror.

FIG. 3 is a detailed view of bubble 230 in FIG. 2, which focuses on the horizontal axis 210 of the mirror 200.

Figure 4:
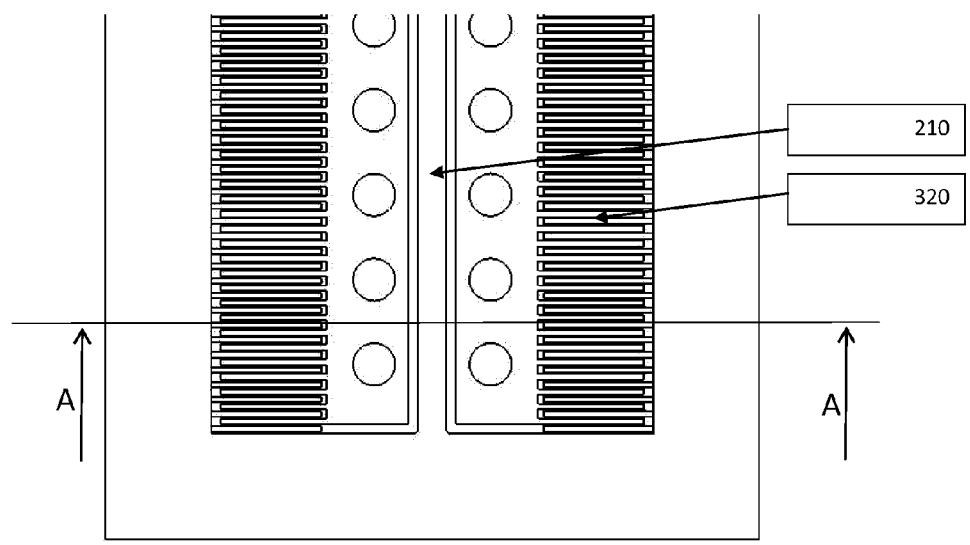
FIG. 4 is a detailed view of a portion of the apparatus of FIG. 3.

FIG. 4 is a detailed view of a portion 310 of FIG. 3, which focuses on one edge of the horizontal axis of the mirror. The dense parallel rectangles are silicon teeth 320 typically manufactured as an integral part of the MEMS. The silicone teeth 320 constitute a capacitance sensor, which is used to sense the mechanical motion of the axis.

Figure 5:
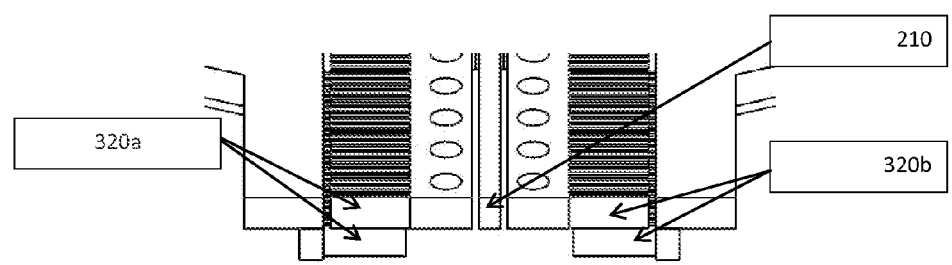
FIG. 5 is a cross-sectional illustration taken along A-A of FIG. 4.

FIG. 5 is a cross-sectional illustration taken along A-A of FIG. 4. FIG. 5 illustrates the two layers of silicon teeth 320a, 320b that form the capacitive sensor. When the axis is horizontal, the teeth 320a, 320b are typically perfectly parallel and the capacitance is negligible. However, when the axis 210 is rotated, the teeth in the axis layer are rotated such that a parallel-plate capacitor is created between any two adjacent teeth. The capacitance is monitored continuously during the rotational motion of the axis 210. The capacitance affects or impacts the motion of the axis 210.

Figure 6A:
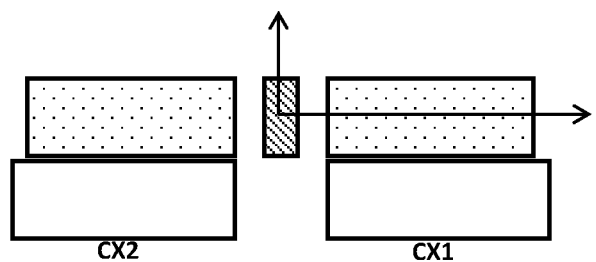
FIGS. 6a-6c are schematic cross-sectional illustrations, taken along A-A, of the x axis and the capacitor silicon plates in 3 different relative orientations respectively.
Figure 6B:
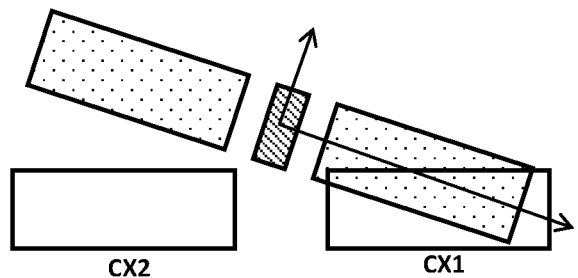
Figure 6C:
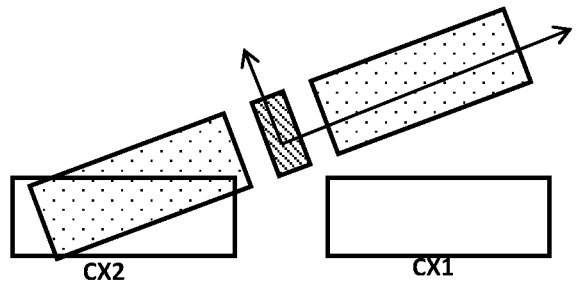
Figure 6D:
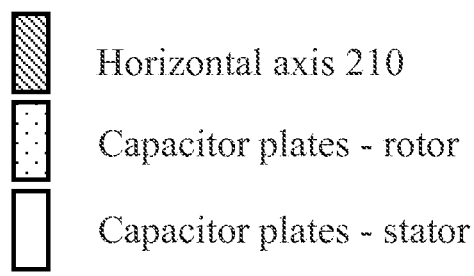
FIG. 6d depicts the legend for the different cross-sectional components of FIGS. 6a-6c.

FIGS. 6a-6c are schematic cross-sectional illustrations, taken along A-A, of the x axis and the capacitor silicon plates in 3 different relative orientations; FIG. 6d depicts the legend for the different cross-sectional components. On the same layer as the x-axis (horizontal axis 210), the rotor capacitor plates are disposed, aligned to the axis such that the rotor capacitor plates rotate about the reference frame together with the axis 210. On the bottom layer, the stator capacitor plates remain fixed during operation. Due to the spatial configuration of the parallel-plate capacitor, when the axis rotates clockwise, the right-hand side capacitor plates typically have overlapping areas (e.g. as shown in FIG. 6b), whereas the left-hand side capacitor plates do not overlap. Consequently, the right-hand side variable capacitor has positive capacitance (CX1>0), whereas the left-hand side variable capacitor has negligible capacitance (e.g. CX2=0).

FIG. 6c depicts the case where the axis rotates counterclockwise. As shown, the left-hand side capacitor plates have overlapping areas, while the right-hand side capacitor plates do not overlap. Consequently, the left-hand side variable capacitor has positive capacitance (CX2>0), where the right-hand side variable capacitor has negligible capacitance (CX1=0).

Finally, during one motion period of the x axis, which includes clockwise rotation during half of the period and counterclockwise rotation during the other half of the period, the capacitance signal CX1−CX2 is a symmetrical signal with respect to its mean value (mean(C)=0), such that it is positive during the first half of the period and negative during the second half of the period.

Generally, the first and second capacitance signals are created from the two sets of parallel plates that are respectively located at the two sides of the rotating axis. The capacitance signals generated from the right-hand side and the left-hand side variable capacitors correspond to the current orientation (location of the axis with respect to its neutral position, e.g. as per FIG. 6a). The capacitance signals generated from the right-hand side capacitive sensor correspond to orientation of the axis according to FIG. 6b. The capacitance signals generated from the left-hand side capacitive sensor correspond to orientation of the axis according to FIG. 6c. Therefore, a transition of the axis from a right orientation to a left orientation should be completed within half of a period.

When the second capacitance signal is subtracted from the first, the resulting difference signal is positive during half of the time and negative during the other half of the time. So, if the difference signal is positive, this indicates that the x axis 210 is oriented according to FIG. 6b whereas if the difference signal is negative this indicates that axis 210 is oriented according to FIG. 6c.

Figure 7A:
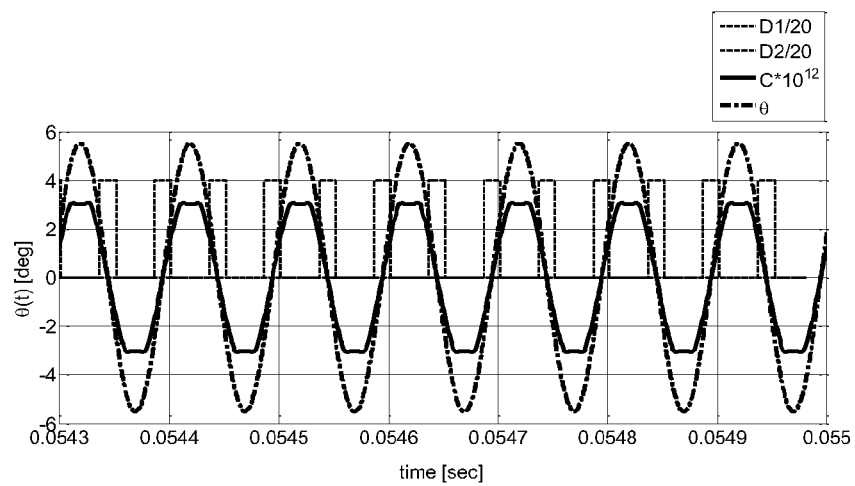
FIG. 7a illustrates an example relationship between three signals.
Figure 7B:
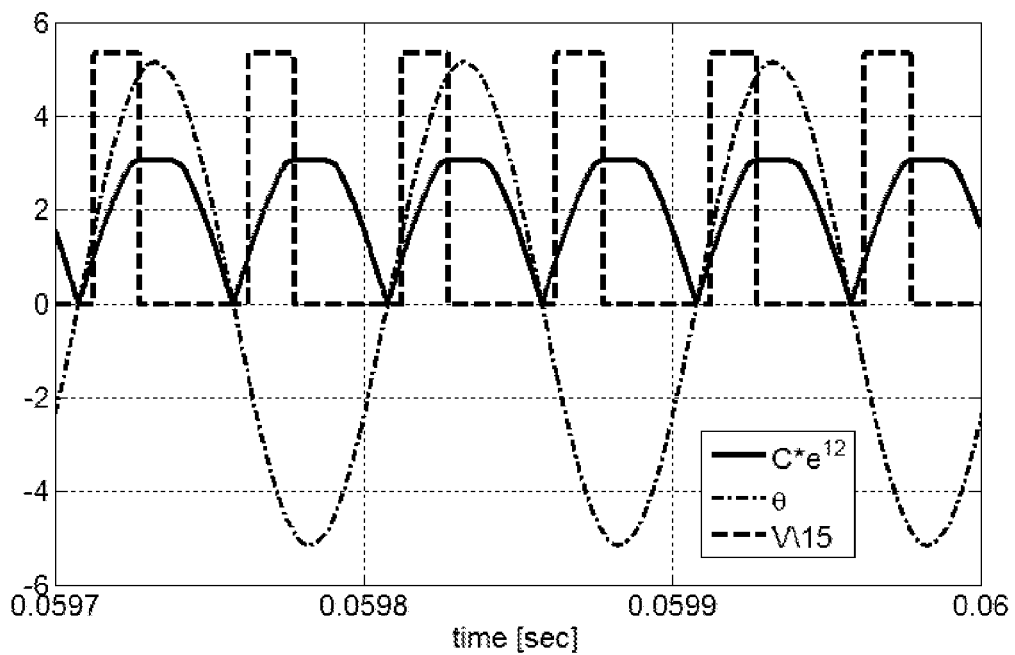
FIG. 7b is a numerical simulation of a scanning mirror movement (sine waveform), along with its driving pulses (rectangle pulses) and sensing signals with a 20 Hz shift from resonance frequency; note time shift of sensor signal to driving pulse.

FIG. 7a illustrates an example relationship between three signals described in further detail below: D1&D2 (drive), theta (output that is not directly measured) and C (capacitance), which is measured and may serve as the reference signal for ultimately sensing change in resonance frequency e.g. as described in detail herein. In FIG. 7a, the driving pulses D1 were scaled by a factor of 20 and the sensing signals by a factor of 10^12, so that the three waveforms can be displayed clearly on the same figure.

Figure 8:
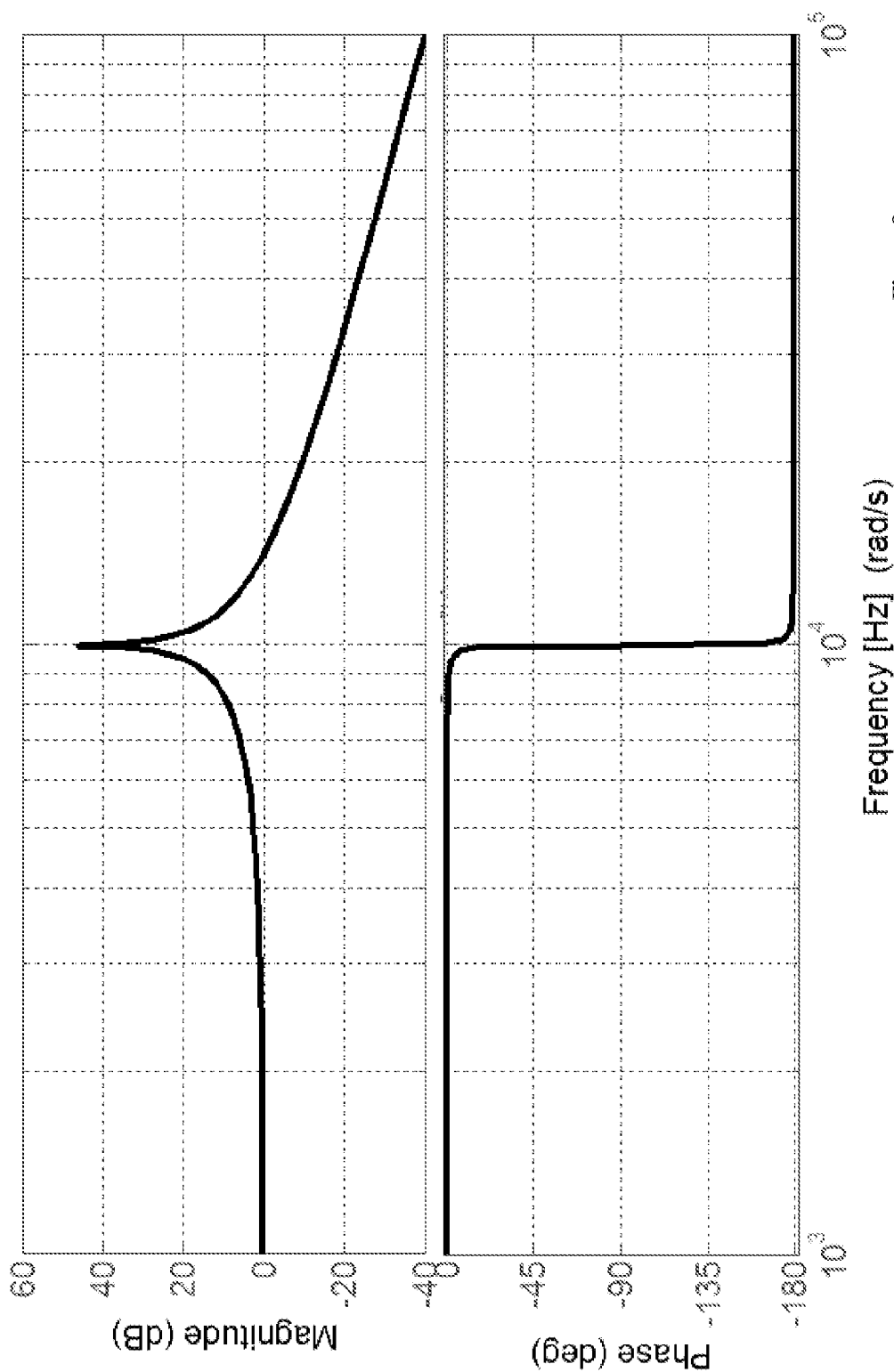
FIG. 8 is a prior-art graph of a standard frequency response of a second order dynamical system.

FIG. 8 is a prior-art graph of a standard frequency response of a second order dynamical system. The top and bottom graphs depict the gain and the phase of the system, respectively. The x axis is the frequency axis. The sharp peak at f=10^4 [Hz] is the gain of the MEMS, which is obtained at its resonance frequency. At this frequency, the phase shift is exactly 90 degrees.

The phase shift is determined by the difference in time between the fundamental harmonic of the actuation signal and that of the device's deflection. When the device vibrates at its resonance, there is a phase shift of 90 degrees between the actuation signal and the device's deflection; the centers of the actuation pulses irrespective of waveform (e.g. pulse or sine waveforms) are aligned with the points where capacitance of the device crosses some reference level (e.g. zero level) to determine the phase shift.

Figure 9A:
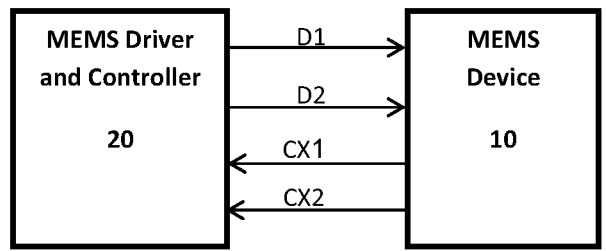
FIG. 9a is a diagram of the signals flowing between MEMS system 10 and its driver and controller unit 20, e.g. of FIG. 1.

FIG. 9a is a diagram of the signals flowing between MEMS system 10 and its driver and controller unit 20, e.g. of FIG. 1. The MEMS driver/controller 20 is also termed herein a "resonance frequency sensor" because it effectively, albeit indirectly, senses or obtains an indication of the resonance frequency.

The MEMS system 10 may comprise an x axis and variable capacitors e.g. as shown in FIG. 5. The driver and controller unit 20 comprises an electronic module used in order to drive the MEMS system 10 at its precise actuation pulses and control its motion. D1 and D2 are driving (voltage) signals created inside the electronic module and sent to the MEMS system 10 by means of electrical connections (e.g. wire bonding). CX1 and CX2 are capacitor sense signals created during operation of the MEMS system 10 and sent to the electronic module by means of electrical connections (wire bonding).

Processes for monitoring changes in the resonance frequency of the MEMS (Micro Electro Mechanical System) are now described. Two example processes are depicted graphically in FIGS. 10 and 11a, 11b respectively; and in flowchart form in FIGS. 12 and 13a-13b respectively, although more generally, any suitable processes for monitoring changes in the resonance frequency may be employed. It is appreciated that some or all steps from the method of FIG. 12 may be combined with some or all steps from the method of FIGS. 13a-13b.

Figure 9B:
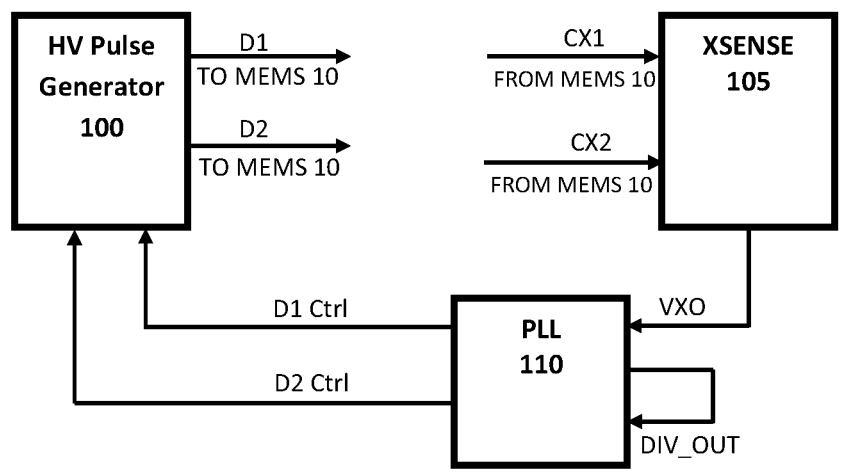
FIG. 9b is a detailed block diagram illustration of the driver and controller unit of FIG. 9a according to a first embodiment, typically including some or all of a High Voltage Pulse Generator (HVPG), a mechanical device (XMEMS), an electronic unit that manipulates the capacitive signals (XSense) and a PLL.

FIG. 9b is a detailed block diagram illustration of the driver and controller unit 20 of FIG. 9a, for the mechanical device (XMEMS) 10 of FIG. 9a, according to a first embodiment of the invention. The driver and controller unit 20 typically includes some or all of a High Voltage Pulse Generator (HVPG) 100, an electronic unit that manipulates the capacitive signals (XSense 105) and a PLL 110.

Figure 10:
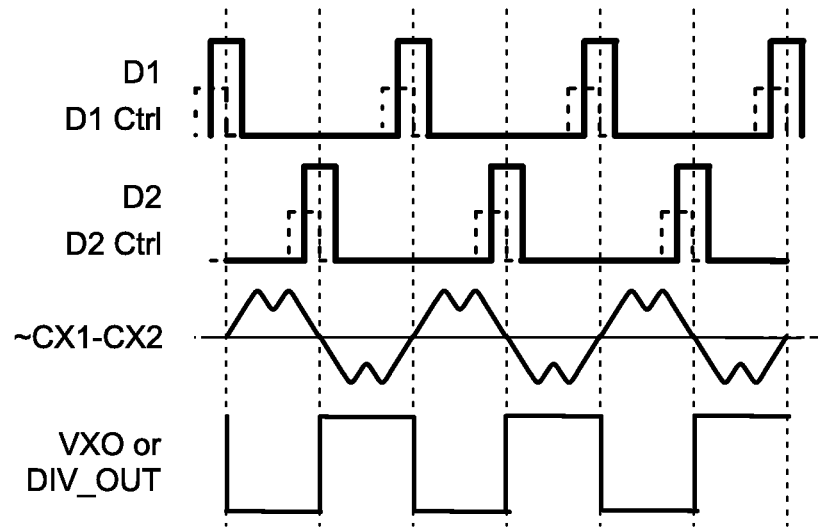
FIG. 10 is a diagram of the signals used to drive and sense the mechanical system, as shown in FIG. 9b.

FIG. 10 is a diagram of signals used to drive and sense the mechanical system, as shown in FIG. 9b.

According to certain embodiments, the mechanical device (XMEMS 10) is driven by voltage excitation pulses D1 and D2, which are synchronized such that two drive signals occur in one motion period, which is defined as the time duration for the MEMS to return to any arbitrary location during its typically periodic motion. The period is the inverse of the MEMS resonance frequency [Hz] of the XMEMS 10. More specifically, if the XMEMS resonance frequency is 10 KHz, then the XMEMS 10's period is equal to 100 micro sec. Thus, the drive signals D1 and D2 are each working in 10 KHz, but with a phase shift of 180 degrees from one another. So there is one drive pulse in half of the motion period, thus the driving pulses have a frequency of 20 HHz, hence a period of 50 micro sec. D1 and D2 are typically High-Voltage pulses, which may be of the order of magnitude of 80 volts, but this is not intended to be limiting; for example, their value may be in the range of 10-200 volts, depending on the application and the desirable motion of the XMEMS 10.

According to certain embodiments, as a result of the synchronized driving pulses, the XMEMS resonates, since the horizontal axis 210 rotates in a periodic manner, with frequency equal to the excitation's frequency. The mechanical motion of the axis is monitored via a capacitor sensor, which typically comprises two independent capacitance teeth arrays, CX1 and CX2, located at each side of the XMEMS. The rotational motion of the horizontal axis 210 yields variable capacitance on one side of the axis, while the second sensor has zero capacitance.

Therefore, during the first period of the motion, the first sensor or teeth array CX1 has a positive capacitance and the second sensor or teeth array CX2 shows a zero capacitance. In contrast, during the second period of the motion the first sensor CX1 has a zero capacitance and the second sensor CX2 has a positive capacitance. The two signals, CX1 and CX2, are combined to yield a difference between the first and second capacitance signals. This difference signal, CX1−CX2, is a periodic signal which is positive during the first half of the motion period and negative during the second half of the motion period. CX1−CX2 is the output of the sensor (XSense) 105 in FIG. 9b, which is fed into the PLL 110.

The PLL (Phase Locked Loop) 110 may comprise a conventional component in control systems operative to find the phase of an input signal. More generally, the PLL 110 is typically operative to generate an output signal whose phase is related to the phase of an input reference signal. The phase of the input signal to the PLL 110, CX1−CX2, is determined from the mechanical motion of the XMEMS. The PLL 110 generates an internal signal (DIV_OUT), which has two states (either 0 or 1), the change between the two states occurring when the input signal (CX1−CX2) crosses a reference level. In the illustrated embodiment, the signal (CX1−CX2) is a periodic signal which is symmetric with respect to zero, so the reference level is defined as the zero-crossing of this signal. Consequently, the VXO signal toggles when the device capacitance difference crosses the zero-reference-level. VXO is used as a reference clock for the PLL 110 that adjusts its divider output phase and frequency to match with that of VXO. The two signals D1 Ctrl and D2 Ctrl, which are generated by the PLL 110, have the frequency and the phase of the VXO. Both D1 Ctrl and D2 Ctrl are low-voltage signals with values of 3.3 volts each, which are sent from the PLL 110 to the High Voltage Pulse Generator. The HVPG boosts the low-voltage signals from 3.3 [V] to high-voltage signals (80[V]).

More generally, the signals D1 and D2 are voltage signals that drive the XMEMS 10. During operation, two capacitance signals are created at the XMEMS 10 (CX1 and CX2), which are sent to the electronic unit XSense 105, which manipulates these signals such that the difference CX1−CX2 is created, and this signal (VXO) is sent to the PLL 110. The PLL 110 identifies the zero-crossing of the VXO signal and generates a logic signal with constant frequency of the VXO. The outputs of the PLL 110 comprise the signals D1 Ctrl and D2 Ctrl, which are 3.3 V signals with the same frequency and with a constant phase to the VXO.

Typically, a block in computer memory that may for example reside at the MEMS driver and controller unit 20 in FIG. 1 stores the reference level value (say 0) to allow comparison of the value of the capacitance VXO (which changes with time) to the reference level stored in memory.

Example of comparison process using the apparatus of FIG. 9b

Reference level in Memory=0
Define VXO(t)=CX1(t)−CX2(t)
Check VXO(t)
If VXO(t)>Reference level in Memory
DIV_OUT=0
Else if VXO(t)<Reference level in Memory
DIV_OUT=1
The following table of example values shows that in the transition between T4 and T5 the signal CX1−CX2 changes from positive to negative. Therefore, the output DIV_OUT changes respectively:

|  | T1 | T2 | T3 | T4 | T5 | T6 | T7 | T8 |
| --- | --- | --- | --- | --- | --- | --- | --- | --- |
| CX1-CX2 | 1.2 | 0.8 | 0.3 | 0.1 | −0.2 | −0.7 | −0.9 | −1.1 |
| DIV_OUT | 0 | 0 | 0 | 0 | 1 | 1 | 1 | 1 |

In the illustrated embodiment, zero capacitance serves as a reference level, i.e. the mean value of the signal is zero, and when the difference signal changes its sign, i.e. turns from positive to negative or vice-versa, it is said to cross a zero-reference-level. However, more generally, the signal mean value need not be zero, and may be, say, 10, with an amplitude of, say, 4. The peak values of such a signal would then extend from 6 to 14. The processes shown and described herein may therefore be operative, mutatis mutandis, such that the signal is changed, relative to a reference level that is equal to a non-zero mean value of the signal, e.g. 10.

More generally, a first process for monitoring changes in the resonance frequency of the MEMS (Micro Electro Mechanical System) is illustrated in flowchart form in FIG. 12. The method of FIG. 12 may be performed by the PLL 110 of FIG. 9b. It is appreciated that the zero-crossing of the signal (CX1−CX2) occurs exactly at the middle of the excitation's pulses. For example, the width of each one of the excitation pulses, in the illustrated embodiment, is 15 micro sec. Therefore, the zero-crossing of the capacitance difference is obtained 7.5 micro sec after the beginning of the driving pulses.

A second apparatus and method for monitoring changes in the resonance frequency of the MEMS (Micro Electro Mechanical System) are now described with reference to FIGS. 9c, 11a-11b and 13a-13b.

Figure 9C:
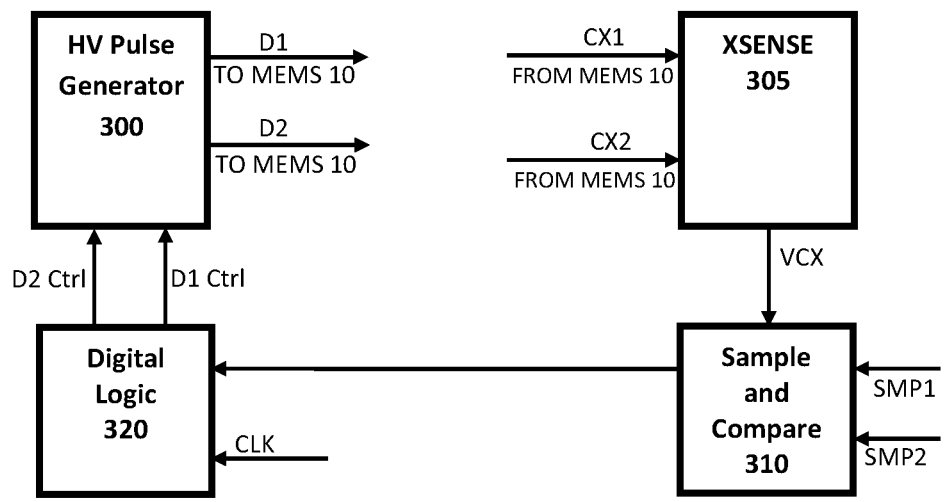
FIG. 9c is a detailed block diagram illustration of the driver and controller of FIG. 9a according to a second embodiment, typically including some or all of a High Voltage Pulse Generator (HVPG), a mechanical device (XMEMS), an electronic unit that manipulates the capacitive signals (XSense), a Sample and Compare unit and a Digital Logic unit.

FIG. 9c is a detailed block diagram illustration of the driver & controller 20 of FIG. 9a, according to the second embodiment, e.g. for operation in conjunction with the process of FIGS. 13a-13b. The driver & controller 20, as shown in FIG. 9c, typically includes some or all of a High Voltage Pulse Generator (HVPG) 300 which may be identical to HVPG 100 of FIG. 9b, an electronic unit that manipulates the capacitive signals (XSense 305) which may be identical to XSense 105 of FIG. 9b, a Sample and Compare unit 310 and a Digital Logic unit 320.

Figure 11A:
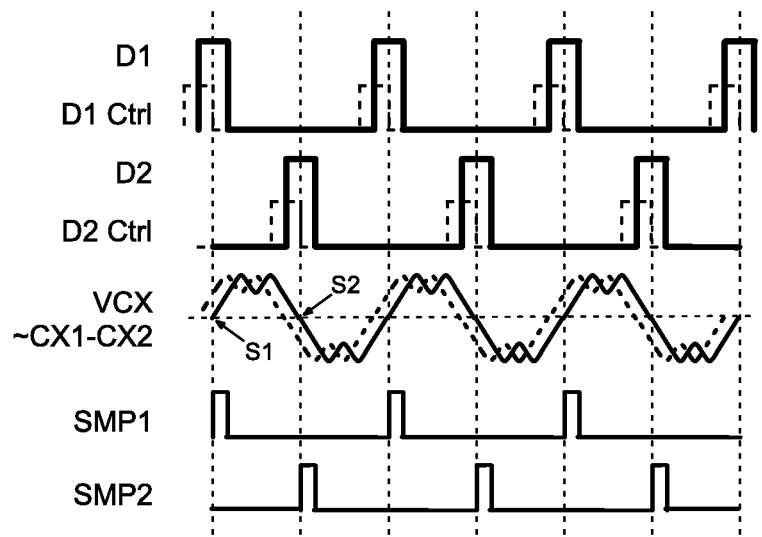
FIGS. 11a-11b depict the electrical signals that are used to drive and sense the mechanical system of FIG. 9c.
Figure 11B:
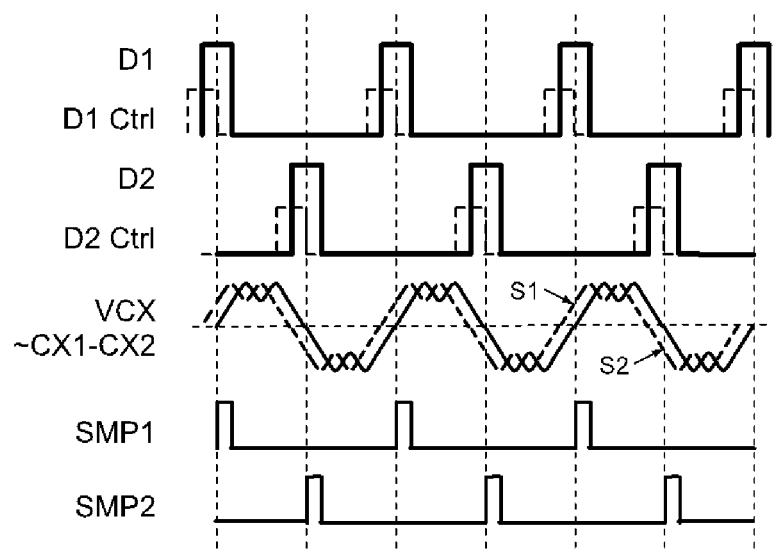

FIGS. 11a-11b depict the electrical signals that are used to drive and sense the mechanical system of FIG. 9c.

Typically, the signals D1 and D2 are voltage signals that drive the XMEMS 10. During operation, two capacitance signals CX1 and CX2 are created at the XMEMS 10 and are sent to electronic unit XSense 305, which manipulates signals CX1 and CX2 such that the difference CX1−CX2 is created. This difference signal (also termed herein VCX) is continuously sent to the Sample and Compare unit 310. The continuous signal is sampled twice per period typically at two predefined sample times: SMP1 and SMP2. The Sample & Compare unit 310 compares the two sampled values of the capacitance signal and decides what the frequency change should be (frequency up or frequency down) according to the relative difference between the two samples. The output of the Sample and Compare unit 310 includes a command to the Digital Logic with values that cause an increase or decrease of the frequency of the output of the Digital Logic. An internal timing signal (CLK) generates the clock for the Digital Logic, which defines the timing of the D1 Ctrl and D2 Ctrl. The output signals D1 Ctrl and D2 Ctrl may be 3.3 V signals with the same frequency and with a constant phase to the VCX.

The mechanical device (XMEMS 10) is driven by voltage excitation pulses, D1 and D2, that are synchronized such that there are two drive signals in one motion period of the XMEMS 10 e.g. as described above with reference to FIG. 3. As a result of the synchronized driving pulses, the XMEMS 10 resonates. Two variable sensors generate the signals, CX1 and CX2, which are identical to the ones described on above with reference to FIG. 9b. The two signals CX1 and CX2 are combined by means of the difference between them: VCX=CX1−CX2, which is the output of the sensor (XSense 305). VCX is sent to the Sample & Compare unit 310.

The Sample & Compare unit 310 examines the input signal VCX according to two sample timing signals: SMP1 and SMP2 that define two points in time in which the VCX is sampled. The sampled data of SMP1 and SMP2 are designated S1 and S2, respectively. These two values are obtained and compared to one another. The solid thick curve in FIG. 11a depicts a signal for which S1=S2=0. If this is the case, the frequency of the driving signals D1 Ctrl and D2 Ctrl is precisely equal to the resonance frequency of the XMEMS. In this case, the phase shift between the device's motion and the driving pulses is exactly pi/2 (90 degrees).

FIG. 11b depicts a different case, which pertains to a different scenario in which S1 is not equal to S2, which is monitored by a phase shift smaller than 90 [deg]. The thin dashed curve in FIG. 11b depicts a case in which the XMEMS device 10 operates at a frequency that is lower than the resonance frequency. Therefore, the phase shift between the device's motion and the driving pulses is less than 90 degrees. Therefore, the VCX curve in the timing figure moves to the left, and thus the sampled values are not equal. Since the VCX signal moves left, S1 is greater than S2, and the comparison circuit 310 detects this and sends out a control signal to the Digital Logic circuit 320, which increases the frequency of driving pulses. This continues until the condition of {S1 equals S2} is satisfied, which ensures that the device operates at resonance frequency.

The other case, in which the device works at frequency that is higher than the resonance frequency, is monitored by a phase shift between the device's motion and the driving pulses that is higher than 90 degrees. Therefore, the VCX curve in the timing figure moves to the right, and thus VS1 is negative and VS2 is positive. In this case, the control signal generated at the Sample and Compare unit 310 decreases the frequency of driving pulses.

The second process for monitoring changes in the resonance frequency of the MEMS (Micro Electro Mechanical System) is illustrated in flowchart form in FIGS. 13a-13b. The method of FIGS. 13a-13b may be performed by the Sample & Compare unit 310 of FIG. 9c. It is appreciated that the zero-crossing of the signal (CX1–CX2) is obtained exactly at the middle of the excitation's pulses. For example, if the width of each one of the excitation pulses is 15 micro sec, the zero-crossing of the capacitance difference is obtained at 7.5 micro sec after the beginning of the driving pulses.

Typically, there is a predefined resolution for changing the operating frequency, say a value within the range of 0.1 Hz to 1 Hz. If the Sample & Compare unit 310 identifies that an increase of N (1 Hz, say) is required in the operating frequency, and the resolution of the operating frequency change is n (say, 0.1 Hz), then N/n (e.g. 10, in this example) iterations (steps) may be employed to effect that change.

The first and second example methods for monitoring changes in the resonance frequency of the MEMS (Micro Electro Mechanical System) are now described in detail with reference to FIGS. 12 and 13*a*-13*b* respectively.

Referring first to FIG. 12, the first method may comprise some or all of the following steps, suitably ordered e.g. as shown:

1210: Two excitation voltage pulses, D1 and D2, drive the XMEMS 10, such that the x axis (e.g. 210 in FIG. 2) rotates and capacitance is created between its variable capacitor plates.

1220. The capacitance signals CX1 and CX2 are continuously sent to the XSense 105 such that at every point in time, the difference VXO=CX1–CX2 is computed.

1230. The VXO signal is positive during one half of the motion period and negative during the second half of the motion period of the XMEMS 10. Therefore, in some point in time, this signal crosses a reference level value, which is the zero capacitance value.

1240. The VXO signal is sent to the PLL 110.

1250. The PLL 110 generates an internal signal (DIV_OUT), which toggles when the VXO capacitance signal crosses the zero-reference-level. The DIV_OUT signal is a logic signal with two states (either 0 or 1) where the change between the two states occurs when the input signal VXO crosses the reference level.

1260. When DIV_OUT toggles down (from 1 to zero), the PLL 110 sends a voltage signal D1 Ctrl. When DIV_OUT toggles up (from zero to 1), the PLL 110 sends a voltage signal D2 Ctrl. The polarity of these signals can be changed (e.g. which signal is sent from the PLL 110 when it toggles up or down may be determined by choice).

1270. The signals D1 Ctrl and D2 Ctrl are boosted at the High Voltage Pulse Generator. The time delay between D1 Ctrl and D1 and between D2 Ctrl and D2 is a constant delay, due to the amplification of the of the 3.3 Volt signals to the 80 Volt signals.

The second example method for monitoring changes in the resonance frequency of the MEMS (Micro Electro Mechanical System) 10 is now described in detail with reference to FIG. 13*a*-13*b*. The second method may comprise some or all of the following steps, suitably ordered e.g. as shown:

1320: Two excitation voltage pulses, D1 and D2, drive the XMEMS 10, such that the x axis rotates and capacitance is created between its variable capacitor plates.

1330: The capacitance signals CX1 and CX2 are continuously sent to the XSense 305 such that at every point in time, the difference VCX=CX1–CX2 is computed.

1340: The VCX signal is positive during one half of the motion period and negative during the second half of the motion period of the XMEMS 10. Therefore, in some point in time, this signal crosses a reference value, which is the zero capacitance value.

1350: The VCX signal is sent to the Sample & Compare unit 310.

1360: The Sample & Compare unit 310 samples the continuous VCX signal at two predefined sample times SMP1 and SMP2. At these points in time, the value of the capacitance is compared. S1 and S2 are the capacitance values at sample times SMP1 and SMP2, respectively.

The two sample times SMP1 and SMP2 are typically determined according to an internal clock inside the Sample and Compare unit 310. These sample times may be programmed by the user to the estimated values according to the application and may also be related to a system clock that may be found in one of the digital components of the system, say at the MEMS driver and controller Unit 20, depicted in FIG. 1. The S1 and S2 are values of the capacitance signals. They do not relate directly to the resonance frequency or to the drive frequency. But comparison made between these two capacitance values typically determines the 'direction' (frequency up or frequency down) of the change required

1365: If S1=S2 (FIG. 11*a*), the VCX was sampled exactly at the zero-crossing point, which implies that S1=S2=0. In this case, the frequency of D1 and D2 is perfectly tuned to the frequency of the VCX, so no change is required in the driving pulses frequency.

1370: If S1>S2 (FIG. 11*b*), the VCX is shifted to the left-hand side. This implies that the frequency of D1 Ctrl and D2 Ctrl should be increased. The Sample and Compare unit 310 sends a control signal to the Digital Logic circuit 320, which increases the frequency of the driving pulses. This continues until the condition of S1 equals S2 is satisfied, which ensures that the device operates at resonance frequency.

Alternatively, if S1<S2, the VCX is shifted to the right-hand side. This implies that the frequency of D1 Ctrl and D2 Ctrl should be decreased. The Sample and Compare unit 310 sends a control signal to the Digital Logic circuit 320, which decreases the frequency of driving pulses.

1375. The resolution of the change in the frequency can be tuned, in the range of 0.1 Hz to 1 Hz. This means that the change of the D1 Ctrl and D2 Ctrl is iterative, and the amount of change that is supplied to these signals is relative to the desired change, but is not necessarily equal to the change. For example, if the difference between S1 and S2 is 2.3 Hz, and the resolution of the change is 0.1 Hz, there will be 23 corrections until the accurate frequency is achieved.

1380. The D1 Ctrl and D2 Ctrl signals are boosted at the High Voltage Pulse Generator. The time delay between D1 Ctrl and D1 and between D2 Ctrl and D2 is a constant delay, due to the amplification of the 3.3 volt signals to the 80 volt signals.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment. For example, a system embodiment is intended to include a corresponding process embodiment. Conversely, features of the invention, including method steps, which are described for brevity in the context of a single embodiment or in a certain order may be provided separately or in any suitable subcombination or in a different order. The term "e.g." is used herein in the sense of a specific example which is not intended to be limiting. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A resonance locking system for a Micro-Electro-Mechanical System (MEMS)-based mechanical device which uses at least one scanning micro-mirror, the system comprising:
   a resonance frequency sensor operative for sensing change in a varying resonance frequency of a miniature mechanical device including a moving mirror assembly having a driving frequency, by comparing a current resonance frequency to a reference; and
   a feedback loop changing at least one aspect of use of the miniature moving mirror assembly responsive to a current value of the resonance frequency measured by said sensor,
   wherein said comparing includes determining whether or not the resonance frequency is different from the driving frequency and wherein, if so, said feedback loop is used to adjust said driving frequency accordingly,
   wherein the system uses a PLL unit to shift the driving frequency to the resonance frequency at reference clock occurring when said apparatus for sensing crosses a zero-reference-level,
   wherein the mechanical device includes a stator and a rotor forming respective parallel plates of a variable capacitor and defining first and second capacitance signals,
   and wherein said reference comprises a zero-reference-level of a difference between said first and second capacitance signals, wherein the zero-reference-level occurs during a transition between:
      a first state in which said first capacitive signal is positive and non-negligible, said second capacitive signal is negligible, and said difference is positive; and
      a second state in which said first capacitive signal is negligible, said second capacitive signal is positive and non-negligible, and said difference is negative.

2. The system of claim 1 wherein the moving mirror assembly is driven at a driving frequency and wherein the feedback loop is operative to shift at least the driving frequency responsive to at least a most recently monitored value of the resonance frequency.

3. The system of claim 2 wherein the driving frequency is shifted to a multiple of the most recently measured value of the resonance frequency of the mechanical device.

4. The system of claim 1 wherein the miniature mechanical device comprises a MEMS.

5. The system of claim 1 which shifts the operating frequency to the resonance frequency using a comparison of two measurements of the sensor signals at a particular timing of the driving pulses.

6. The system of claim 1 wherein said resonance frequency defines a period and wherein said comparing comprises identifying a zero crossing level once each half of said period.

7. The system of claim 1 wherein said reference comprises a zero capacitance level.

8. The system of claim 1 wherein said resonance frequency defines a period and wherein sampling of a continuous signal representing said difference is performed twice each half of said period.

9. The system according to claim 1 wherein said comparing comprises comparing a first capacitive value within sampled data to an additional capacitive component operative to determine timing of sampling of said sampled data.

10. The system of claim 1 wherein said device comprises a mirror assembly including a micro-mirror mounted and driven to rotate about an axis.

11. The system of claim 10 wherein said resonance locking system comprises the mechanical device and said mirror assembly is a component of the mechanical device.

12. The system of claim 1 wherein said device comprises a mirror assembly including a micro-mirror mounted and driven to vibrate laterally along an axis.

13. The system of claim 12 wherein said resonance locking system comprises the mechanical device and said mirror assembly is a component of the mechanical device.

14. The system of claim 1 wherein said device comprises an assembly including a mechanical component mounted and driven to rotate about an axis.

15. The system of claim 1 wherein the mechanical device includes a stator and a rotor forming a variable capacitor and defining two capacitance signals and a difference therebetween and wherein the current resonance frequency is derived from said difference.

16. The system of claim 1 wherein said device comprises a physical element mounted and driven for periodic motion, defining a motion period.

17. The system of claim 16 wherein a difference between the first and second capacitance signals is positive during a half of the motion period and negative during another half of the motion period, such that the difference corresponds to a capacitance signal having a zero mean value,
   and wherein said resonance frequency sensor is operative for sampling a continuous signal representing the difference.

18. The system of claim 17 which includes a sample-and-compare component which computes a difference between a current value of the driving frequency and the resonance frequency and shifts the driving frequency toward the resonance frequency by an amount related to the difference.

19. They system of claim 1 wherein said reference comprises a zero-reference-level of said difference between said first and second capacitance signals, wherein the zero-reference-level occurs during a transition between:
   a first state in which said first capacitive signal is positive and non-negligible, and second capacitive signal is negligible, and said difference is positive; and
   a second state in which said first capacitive signal is negligible, said second capacitive signal is positive and non-negligible, and said difference is negative.

20. A resonance locking method for a Micro-Electro-Mechanical System (MEMS)-based mechanical device which uses at least one scanning micro-mirror, comprising:

providing a resonance frequency sensor operative for monitoring a change in a varying resonance frequency of a miniature mechanical device including a moving mirror assembly, by comparing a currently sensed capacitance signal having a frequency to a reference; and if change is monitored by said sensor, changing at least one aspect of use of the mechanical device responsive to the currently sensed resonance frequency, wherein said comparing includes determining whether or not the resonance frequency is different from the driving frequency and wherein, if so, said changing includes adjusting said driving frequency accordingly, wherein the method uses a PLL unit to shift the driving frequency to the resonance frequency at a reference clock occurring when said apparatus for sensing crosses a zero-reference-level, wherein the mechanical device includes a stator and a rotor forming respective parallel plates of a variable capacitor and defining first and second capacitance signals, and wherein said reference comprises a zero-reference-level of a difference between said first and second capacitance signals, wherein the zero-reference-level occurs during a transition between;

- a first state in which said first capacitive signal is positive and non-negligible, and second capacitive signal is negligible, and said difference is positive; and
- a second state in which said first capacitive signal is negligible, said second capacitive signal is positive and non-negligible, and said difference is negative.

21. A method according to claim 20 wherein said changing at least one aspect of use comprises adjusting a driving for the mechanical device responsive to the resonance frequency currently measured from the said sensed capacitance signal.

22. A method according to claim 21 wherein said adjusting the driving frequency for the mechanical device comprises setting the driving frequency to equal the resonance frequency currently measured from the sensed capacitance signal.

* * * * *